United States Patent
Bucey et al.

(10) Patent No.: US 6,520,002 B2
(45) Date of Patent: Feb. 18, 2003

(54) APPARATUS AND METHOD FOR TESTING A RECUPERATOR CELL FOR AN AIR LEAK

(75) Inventors: Charles W. Bucey, San Diego, CA (US); Bruce D. Harkins, Clear Lake Shores, TX (US); Michael S. Nowak, St. Joseph, MI (US)

(73) Assignee: Solar Turbines Inc, San Diego, CA (US)

( * ) Notice: Subject to any disclaimer, the term of this patent is extended or adjusted under 35 U.S.C. 154(b) by 0 days.

(21) Appl. No.: 09/881,545

(22) Filed: Jun. 14, 2001

(65) Prior Publication Data

US 2002/0189327 A1 Dec. 19, 2002

(51) Int. Cl.[7] ............................................. G01M 3/04
(52) U.S. Cl. ...................................... 73/40; 73/49.7
(58) Field of Search .................... 73/40, 49.2, 40.7, 73/49.7, 45.8

(56) References Cited

U.S. PATENT DOCUMENTS

| | | | | |
|---|---|---|---|---|
| 3,813,923 A | * | 6/1974 | Pendleton | 73/49.2 |
| 3,949,598 A | * | 4/1976 | Bergstrand | 73/49.2 |
| 4,126,034 A | * | 11/1978 | Conrad | 73/49.2 |
| 4,584,877 A | * | 4/1986 | Brayman | 73/40.7 |
| 4,813,268 A | * | 3/1989 | Helvey | 73/40.7 |
| 4,862,731 A | * | 9/1989 | Gates | 73/40.7 |
| 5,060,721 A | | 10/1991 | Darragh | |
| 5,172,583 A | * | 12/1992 | Tallon | 73/40.7 |
| 5,361,626 A | * | 11/1994 | Colligan et al. | 73/40.7 |
| 6,314,794 B1 | * | 11/2001 | Seigeot | 73/40.7 |

* cited by examiner

*Primary Examiner*—Hezron Williams
*Assistant Examiner*—C D Garber
(74) *Attorney, Agent, or Firm*—Larry G Cain (57) ABSTRACT

A cell of a recuperator has a passage therein having a first end and a second end. In use a fluid passes through the passage under pressure. The cell must be tested to determine an operational efficiency or leakage within the passage. A pair of sealing mechanisms is positioned at a respective one of the first end and the second end of the passage. A vacuum is pulled across the passage and a rate of leakage is monitored to define an operational cell and a failed cell.

17 Claims, 7 Drawing Sheets

APPARATUS AND METHOD FOR TESTING A RECUPERATOR CELL FOR AN AIR LEAK

TECHNICAL FIELD

This invention relates generally to a heat exchanger or more explicitly to a recuperator and more particularly to a method and an apparatus for construction of the cells making up the recuperator.

BACKGROUND

A recuperator is made from a plurality of cells. The cell is made from a plurality of components parts. Such components being a pair of folded sheets having a donor side and a recipient side. A pair of wing portions defining an inlet passage and an outlet passage. In many cells, guide vanes are positioned in the respective wing portions. And, a plurality of spacer bars are positioned between the pair of folded sheets. The components of the cell are welded together. An example of such a welded cell and recuperator is shown in U.S. Pat. No. 5,060,721 issued on Oct. 29, 1991 to Charles T. Darragh.

During the assembly of the cells and the recuperator, the interface of the components are welded. The effectiveness of the welding process used to form the cells is in many instances depend on the fitting relationship of the components, the resulting configuration of the interface of the components and the welding process itself. The results of these variables in some instances results in a leaking cell, leakage between the donor side and the recipient side. Thus, it is necessary to inspect or check the reliability of the welded cell against leaks prior to installing into the recuperator. Inspection or checking must be done in a reliable and cost effective manner.

The present invention is directed to overcome one or more of the problems as set forth above.

SUMMARY OF THE INVENTION

In one aspect of the invention, an apparatus for testing a leak within a cell of a recuperator is disclosed. The cell has a plurality of components, such components being a plurality of primary surface sheets, a plurality of spacer bars and a pair of guide vanes. The apparatus has a table having a bottom portion and a top portion. The top portion is movable between a closed or testing position and an open or non testing position. A pair of sealing mechanisms is movable between an open or non testing position and a closed or testing position. A vacuum pump is operatively connected to the pair of sealing mechanisms and a controller is operatively connected to the table, the pair of sealing mechanisms and the vacuum pump.

In another aspect of the invention, a method of testing for a leak within a cell for a recuperator is disclosed. The cell has a plurality of components, such components being a plurality of primary surface sheets, a plurality of spacer bars and a pair of guide vanes. The method has the steps of positioning the cell on a bottom portion of a table with a top portion of the table being in an open or non testing position. Moving the top portion into a closed or testing position. Securing the top portion in the closed or testing position to the bottom portion of said table. Actuating a controller. Moving a pair of sealing mechanisms from an open or non testing position to a closed or testing position. Actuating a vacuum pump. Defining a status of the cell by differentiating between an operational cell and a failed cell. Unsecuring the top portion from the bottom portion of the table. Moving the top portion into the open or non testing position. And, removing the cell from the table.

In another aspect of the invention, a system for testing a cell for use in a primary surface recuperator is disclosed. The system has an input station from which the cell after being assembled is made available for testing. A testing station includes a table, a pair of sealing mechanisms, a controller, a vacuum pump and a readout station. The table has a top portion and a bottom portion. The top portion is movable between an open or non testing position and a closed or testing position. In the closed or testing position of the top portion the cell is positioned in the bottom portion and the top portion is positioned in the closed or testing position. The pair of sealing mechanisms is attached to the bottom portion of the table and is movable between an open or non testing position and a closed or testing position. In the closed or testing position of the pair of sealing mechanisms the cell has a first end of a passage in contacting sealing relationship with a one of the pair of sealing mechanisms and a second end of the passage in contacting sealing relationship with an other one of the pair of sealing mechanisms. The controller is in communication with a plurality of sensors. A portion of the plurality of sensor communicates a signal to the controller defining one of a position at which the closed or testing position is operational and a position at which the closed or testing position is not operational. The vacuum pump is actuated by the controller depending on a plurality of signals from a portion of said plurality of sensors. The readout station defines a status of the cell by differentiating between an operational cell and a failed cell. An output station has a pair of positions, one of the pair of positions is an operational cell position and failed cell position.

DETAILED DESCRIPTION

Figure 1:
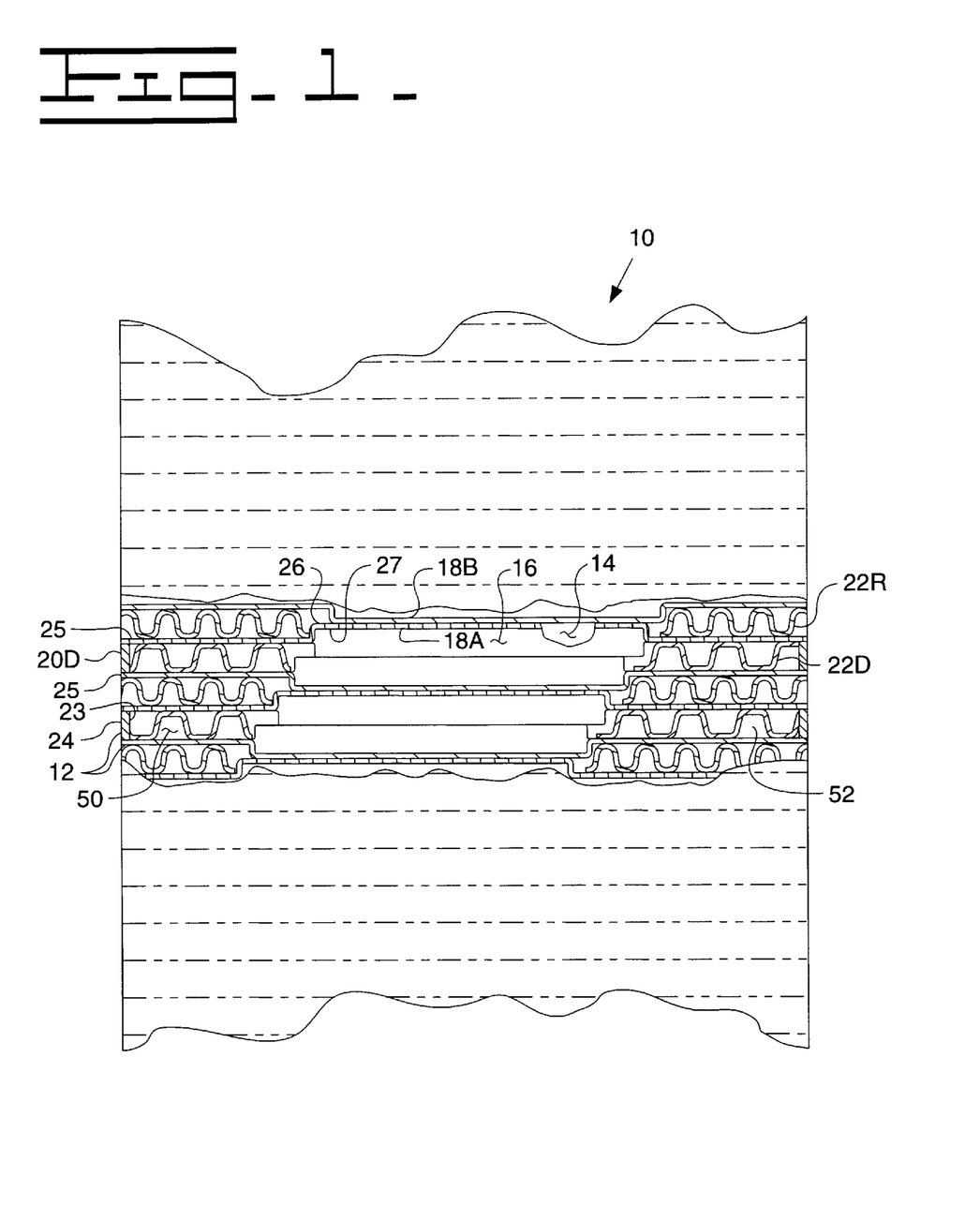
FIG. 1 is a sectional view of a recuperator taken through a plurality of cells.

As best shown in FIG. 1, a recuperator 10 is formed from a plurality of cells 12. The recuperator 10 has a plurality of donor passages 14 and a plurality of recipient passages 16 defined therein. Each of the plurality of cells 12 is made from a plurality of primary surface sheets 18. In this application, a pair of the plurality of primary surface sheets 18 designated as 18A and having a red color code and 18B having a black color code is used in making each cell 12. A plurality of spacer bars 20 and a plurality of guide vanes 22 are also used in making the cell 12. The plurality of spacer bars 20 are divided into a plurality of donor spacer bars 20D and a plurality of recipient spacer bars 20R. And, each of the plurality of spacer bars 20 has a preestablished width "w" extending between a first surface 23 and a second surface 24 and a preestablished thickness "t" extending between a pair of edges 25. The plurality of guide vanes 22 are divided into a donor guide vane 22D having an inlet guide vane and an outlet guide vane and a recipient guide vane 22R having an inlet guide vane and an outlet guide vane.

Figure 2:
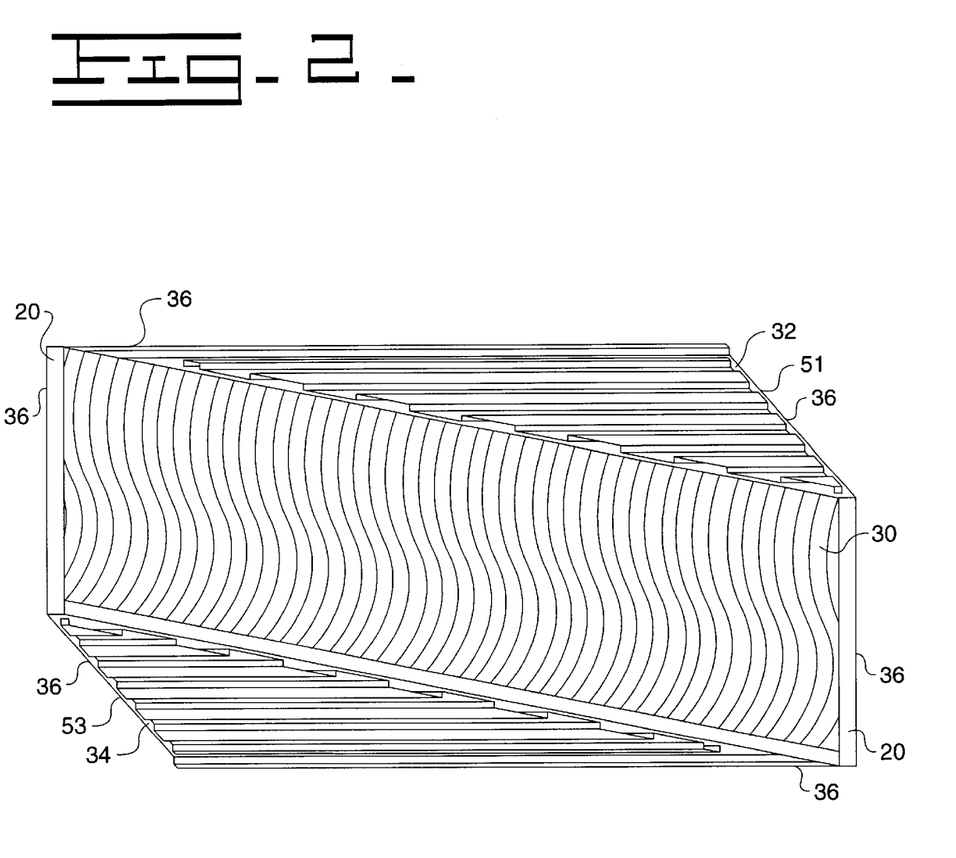
FIG. 2 is a view of one of the plurality of cells partially assembled and used in making the plurality of cells.
Figure 3:
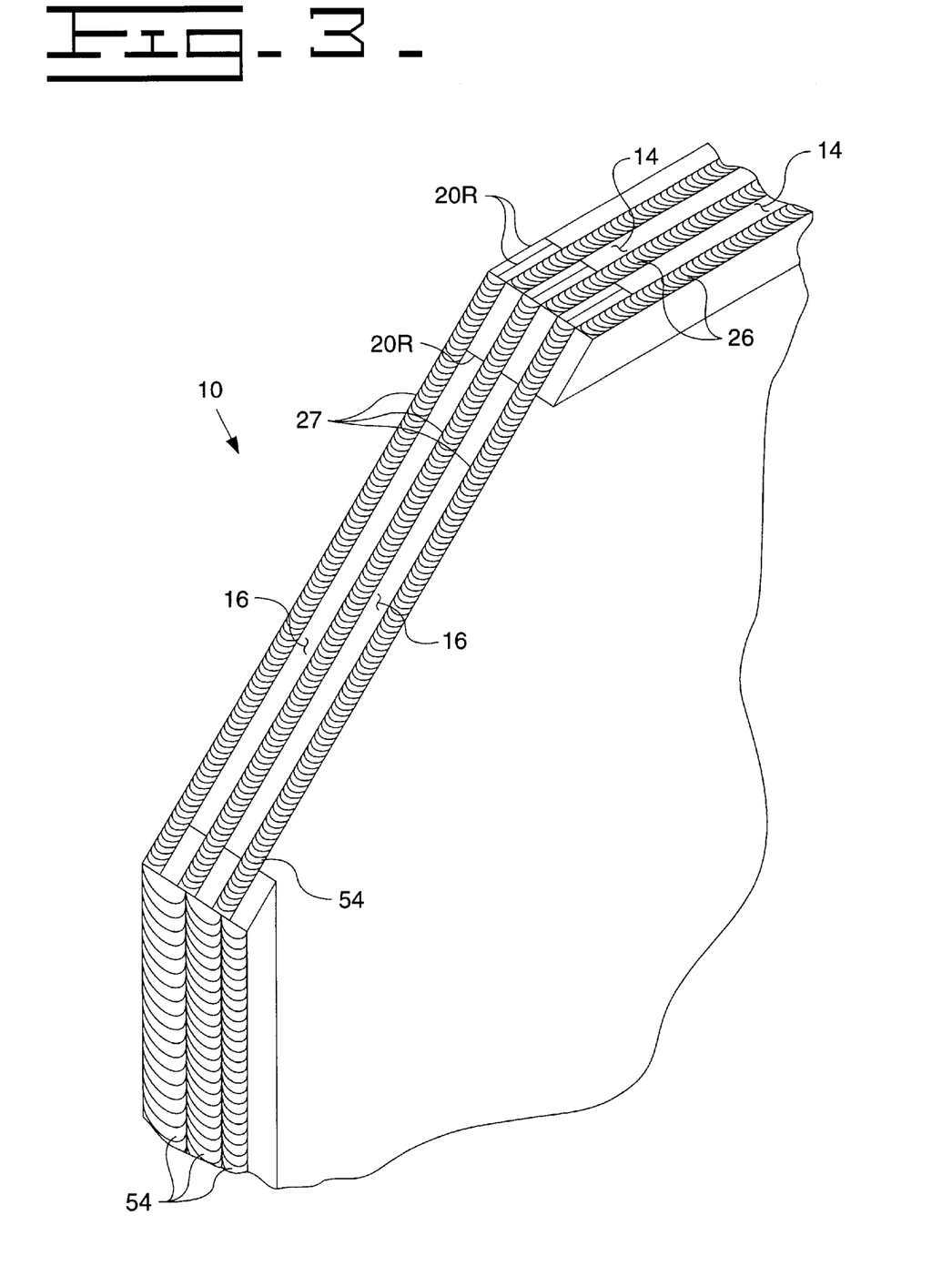
FIG. 3 is a detailed sectional view of the recuperator showing the plurality of cells and a portion of the finished welds thereon.

As best shown in FIGS. 1 and 2, each of the pair of primary surface sheets 18A, 18B is pleated and defines a donor side 26 and a recipient side 27. Each of the plurality of primary surface sheets 18A and 18B has a center portion 30, a first wing portion 32 and a second wing portion 34. In this application, the center portion 30 has a preformed serpentined trapezoidal configuration and each of the first and second wing portions 32,34 has a flattened generally triangular configuration. As an alternative, other configurations could be used without changing the jest of the invention. Each of the plurality of primary surface sheets 18A and 18B define a plurality of edges 36. The plurality of spacer bars 20 are position on the primary surface sheet 18A and 18B alone the respective one of the plurality of edges 36 in a plurality of precise preestablished locations. As shown in FIGS. 1 and 3, one of the pair of primary surface sheets 18A and 18B, on the recipient side 27, has the recipient inlet guide vane 22R attached thereto in the first wing portion 32 in a precise preestablished location. And, the same one of the pair of primary surface sheets 18A and 18B, on the recipient side 27, has the recipient outlet guide vane 22R attached thereto in the second wing portion 34. Interposed the first wing portion 32 of the pair of primary surface sheets 18A and 18B is a recipient inlet passage 50 positioned at a first or inlet end 51 and interposed the second wing portion 34 of the pair of primary surface sheets 18A and 18B is a recipient outlet passage 52 positioned at a second or outlet end 53. As shown in FIG. 3, a plurality of welds 54 are used to complete the assembly of each of the plurality of cells 12 and is further used to assembly the recuperator 10 after each cell has been inspected and tested.

Figure 4:
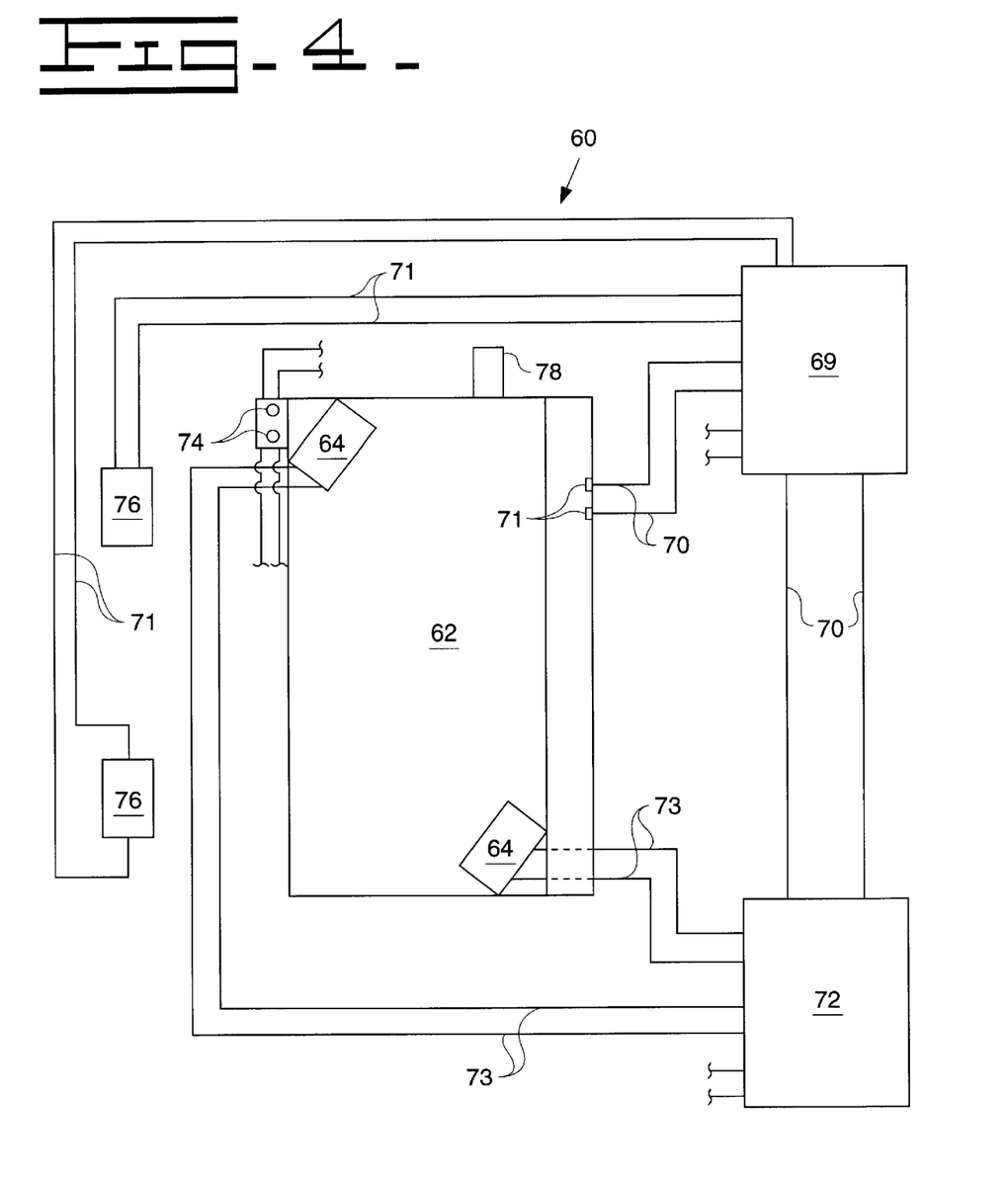
FIG. 4 is a schematically represented view of an inspection line.
Figure 5:
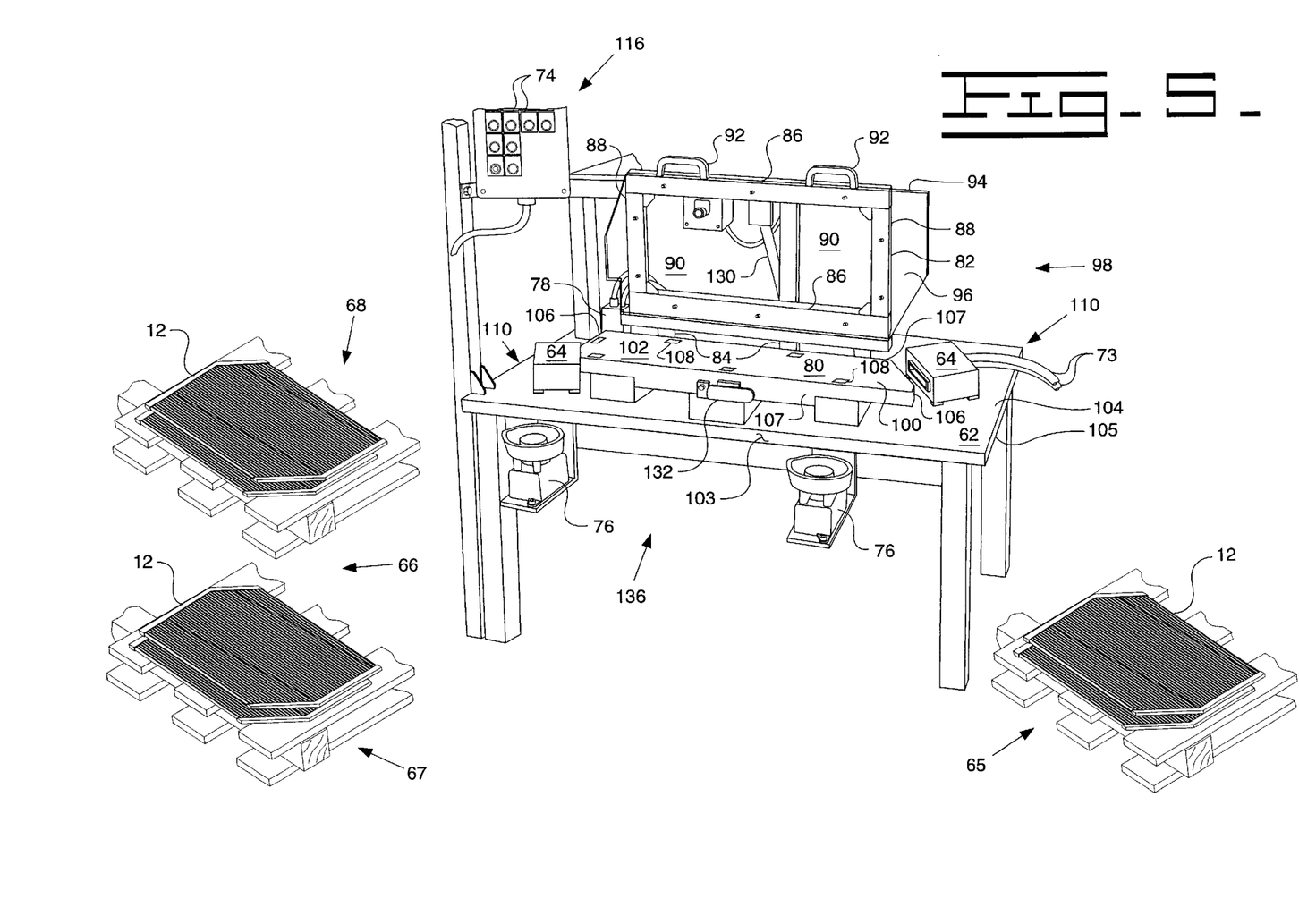
FIG. 5 is a view of an inspection table shown in an open or loading position.

As best seen in FIGS. 4 and 5, a testing or inspection system, apparatus and/or line 60 is shown. The testing or inspection line 60 includes a table 62 having a pair of sealing mechanisms 64 being operatively sealable with the one of the plurality of cells 12. An input station 65 is positioned near the table 62 and has a plurality of welded cells position thereon. An output station 66 is located near the table 62 and has an operational cell position 67 and a failed cell position 68 thereon.

The table 62 is interconnected to a controller 69 by a plurality of leads 70 which extend from a plurality of sensors 71, such as by wires. A source for pulling a vacuum, a vacuum pump 72 is connected to the controller 69 and the pair of mechanism 64. For example, a pair of hoses 73 are fluidly connected to each of the pair of mechanism 64 and a portion of the plurality of leads 70 interconnect the controller 69 and the vacuum pump 72. A plurality of switches 74 are operatively connected to the controller 69 and the vacuum pump 72. A pair of safety devices 76 are operatively attached to the table 62 and the controller 69 and a readout station 78 is operatively attached to the inspection line 60.

As further shown in FIG. 5, the table 62 has a bottom portion 80 and a top portion 82 hingedly connected by a plurality of hinges 84. As an alternative, a single hinge 84 could be used. The top portion 82 has a generally ladder type configuration being formed by a pair of rails 86 spaced apart by a plurality of rungs 88. Interposed the plurality of rungs 88 are a plurality of openings 90. A pair of handles 92 are attached to one of the pair of rails 86 opposite the plurality of hinges 84 and are space one from another. A transparent plate 94 is attached to the top portion 82. As an alternative, the top portion 82 could be a transparent member. The transparent plate 94 has a substantially flat surface 96. The table 62 has the top portion 82 shown in an open or loading position 98 in FIG. 5. The bottom portion 80 has a deck portion 100 having a substantially flat surface 102. The deck portion 100 is elevated from a table top 103 of the table 62 in a conventional manner, such as a plurality of pillars. The table top 103 has a top surface 104 and bottom surface 105. The deck portion 100 has a pair of ends 106 and a pair of sides 107. A plurality of locators 108 are positioned in the deck portion 100 near the respective pair of ends 106 and the pair of sides 107. In this application, the pair of mechanisms 64 are movably attached to the bottom portion 80 of the table 62 at an angle to each of the intersection of one of the pair of ends 106 and one of the pair of sides 107. The pair of sealing mechanism 64 are movable to the bottom portion 80 between a plurality of positions to compensate for testing of a variety of shapes and configurations of cells 12. The pair of mechanisms 64 are operatively aligned with each of the recipient inlet passage 50 and the recipient outlet passage 52 at the respective first end 51 and the second end 53. The pair of mechanisms 64 are spaced from the respective one of the recipient inlet passage 50 and the recipient outlet passage 52 in an open or non testing position 110. The plurality of switches 74 are physically located near one of the pair of ends 106 and at one of the pair of sides 107 opposite the one of the pair of side 107 having the plurality of hinges 84 attached thereto. The plurality of switches 74 are positioned in arms reach of an operator and have an off position 116 in which the pair of mechanisms 64 are positioned in the open or non testing position 110. In this application, the pair of safety devices 76 are positioned near one of the pair of sides 107 being opposite the plurality of hinges 84 and near each of the pair of ends 106. The pair of safety devices 76 are spaces apart but are within arms length of the operator. The readout station 78 can be one of a visual screen, an audible signal or a visual signal such as a green light for an operational or good cell 12 or a red light for a failed or bad cell 12. The readout station 78 could also have a printout defining a result of the test or the results could appear on the visual screen for viewing by the operator or to be recorded by the operator.

Figure 6:
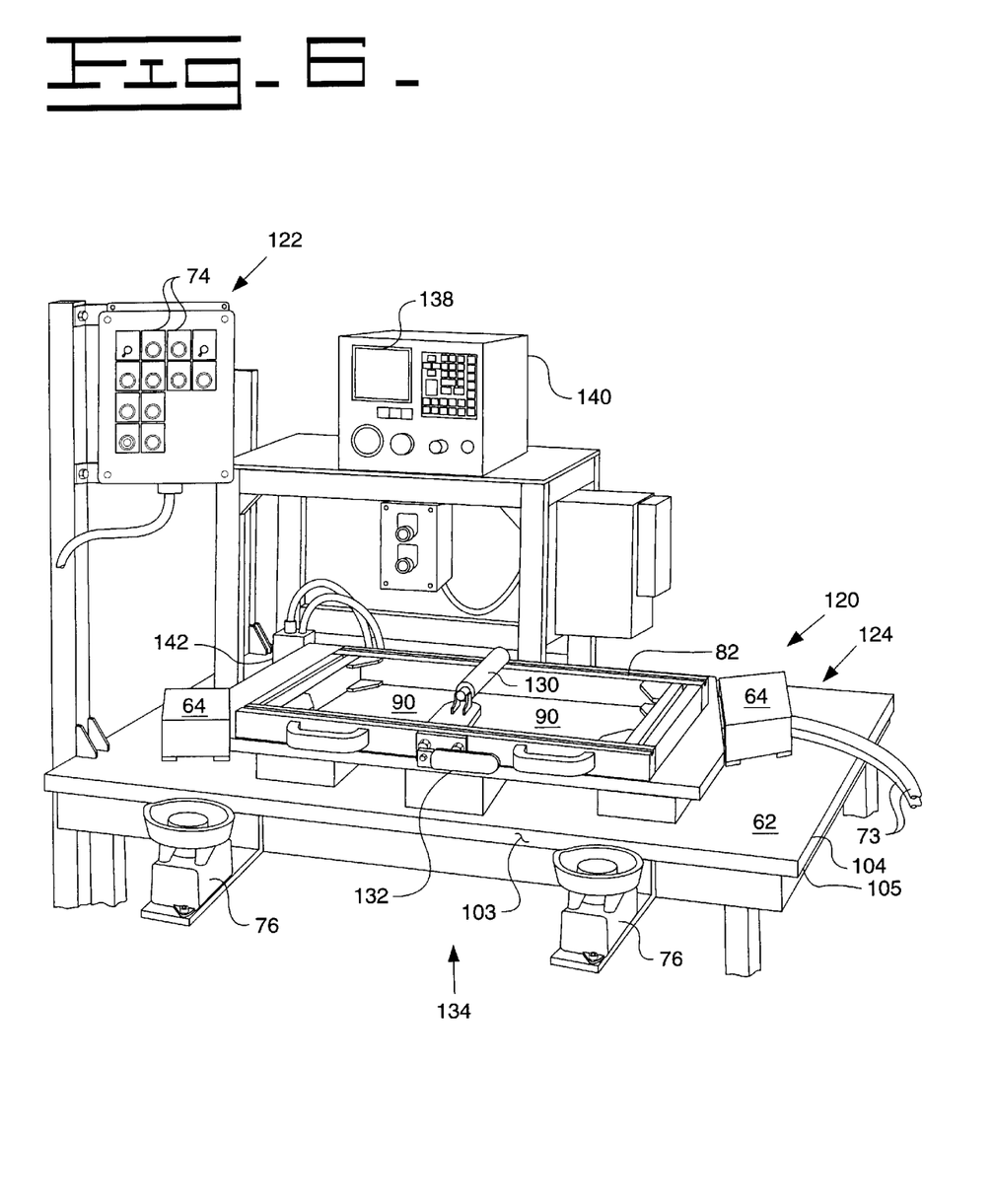
FIG. 6 is view of the inspection table shown in a closed or testing position.
Figure 7:
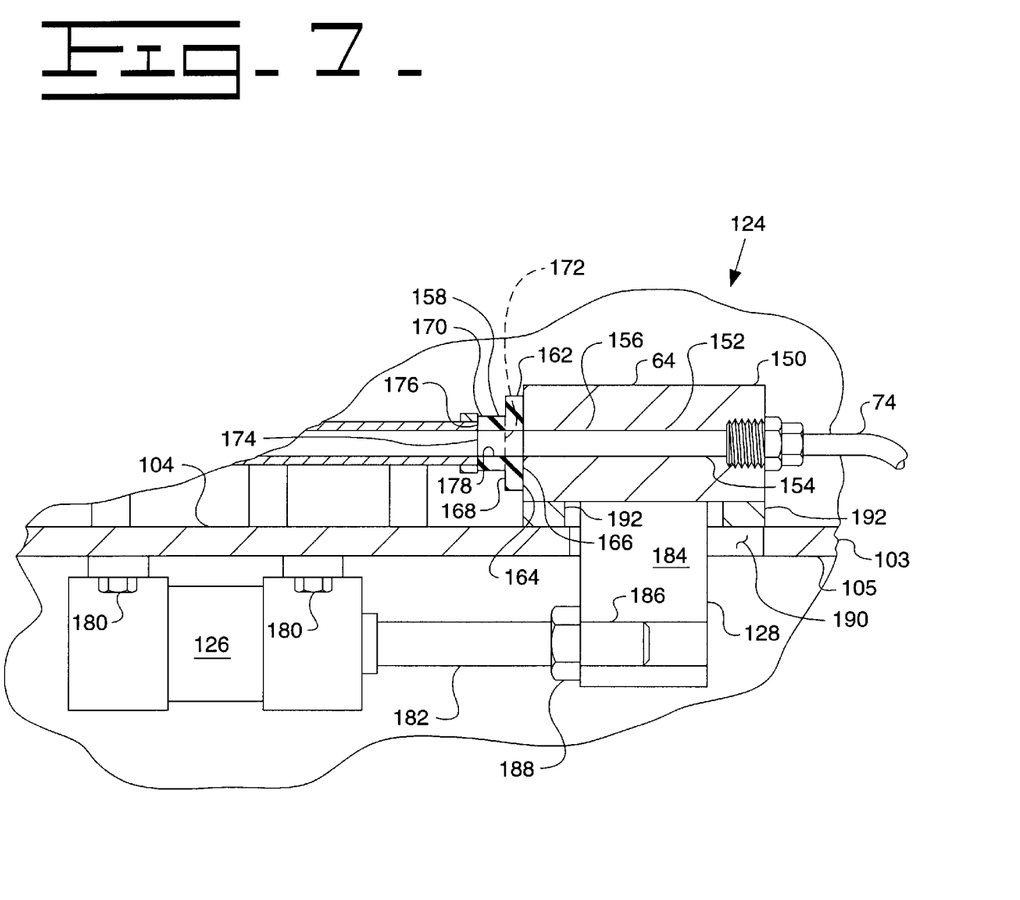
FIG. 7 is a detailed sectional view of a portion of the inspection table and the sealing mechanism shown in FIG. 6.

In FIG. 6, the table 62 has the top portion 82 shown in a closed or testing position 120. The plurality of switches 74 are shown in an on position 122 in which the pair of mechanisms 64 are positioned in the closed or testing position 124 and are sealingly positioned with respect to one of the recipient inlet passage 50 and the recipient outlet passage 52 by a cylinder 126. The cylinder 126 and linkage 128 is best shown in FIG. 7 and will be further defined later. A cylinder 130 is shown in an extended position. In a closed position, not shown, the cylinder 130 is used to assist in maintaining the top portion 82 in the open or loading position 98. A lock 132 is shown in a locked position 134. In FIG. 5, the lock 132 is shown in an unlocked position 136. As discussed above, in this application, the readout station 78 has a visual screen 138 and a printout mechanism 140. The printout mechanism 140 includes a printer head 142 having a supply of ink being fed thereto in a conventional manner. The printer head 142 is movable between a plurality of positions to compensate for testing of a variety of shapes and configurations of the cells 12.

As shown in FIG. 7, the pair of sealing mechanisms 64 includes a housing 150 having a plurality of passage 152 therein, only one being shown. A first end portion 154 of each of the plurality of passages 152 is operatively connected to one of the pair of hoses 74. A second end portion 156 of each of the plurality of passages 152 is operative connected to a seal 158. For example, the cylinder 126 and the linkage 128 maintain the seal 158 in contacting relationship with the housing 150. The seal 158 has a generally "T" shaped cross sectional configuration. A top portion 162 of the "T" has a sealing surface 164 positioned at a first end 166. The top portion 162 has a second end 168 spaced from the first end 166 a preestablished distance. The sealing surface 164 is in contacting relationship with the housing 150 about the plurality of passages 152. A base portion 170 of the "T" has a first end 172, shown in phantom, connected to the second end 168 of the top portion 162 and a second end 174 of the base portion 170 is spaced from the first end 172 a preestablished distance and has a sealing surface 176 thereon. A plurality of passages 178, only one being shown interface between the sealing surface 164 of the top portion 162 and the sealing surface 176 of the base portion 170. With the pair of mechanisms 64 in the closed or testing position 124 the sealing surface 176 of each seal 158 is in sealing engagement with a respective one of the recipient inlet passage 50 and the recipient outlet passage 52 of the cell 12 being tested. And, with the pair of mechanisms 64 in the open or non testing position 110 the sealing surface 176 of each seal 158 is spaced from the respective one of the recipient inlet passage 50 and the recipient outlet passage 52 of the cell 12 to be tested or having been tested.

Each of the pair of pair of mechanisms 64 has one of the cylinders 126 attached to the bottom surface 105 of the table top 103. A plurality of fasteners 180 threadedly engages into the table top 103 and maintain the respective cylinder 126 in place. The linkage 128 extends from a rod 182 of each cylinder 126 to an arm mechanism 184. The arm mechanism 184 has a threaded hole 186 therein to which the rod 182 is attached. A locking nut 188 maintains the relative position of the cylinder 126 to the arm mechanism 184. The arm mechanism 184 is attached to the respective one of the pair of mechanisms 64 and passes through one of a pair of slotted holes 190 in the table top 103. A pair of slider bars 192 are attached to each of the housing 150 and slidably interfaces with the housing 150 and the top surface 104 of the table top 103. A similar arrangement can be used to position the readout station 78 if desired.

Industrial Applicability

In operation, one of the plurality of welded cells 12 is taken from the plurality of cells 12 at the input station 65 and is positioned on the table 62 of the test or inspection line 60. The donor side 26 of the primary surface sheet 18A is positioned in contacting relationship with the flat surface 102 of the deck portion 100 of the bottom portion 80. The plurality of locators 108 positioned near the respective ends 106 and the pair of sides 107 of the deck portion 100 assist in orientation of the individual cell 12 with respect to the pair of sealing mechanisms 64 containing the respective seal 158. As the operator grasps the pair of handles 92, the top portion 82 is pivotally closed about the plurality of hinges 84. Thus, the donor side 26 of the primary surface sheet 18B is positioned in contacting relationship with the flat surface 96 of the transparent plate 94 of the top portion 82. With the top portion 82 and the bottom portion 80 of the table 62 having the transparent plate 94 and the transparent deck 100 respectively, it is easy for the operator to insure that the cell 12 being tested or inspected is flat. With the cell 12 flat, the lock 132 is moved into the locked position 136 by the operator. The plurality of switched 74 are engaged to the on position 122 by the operator and the pair of safety devices 76 are depressed or actuated.

With all switches 74 and devices 76 in the go position and the signal from the plurality of sensors 71 to the controller 69 activated, the rod 182 of each of the cylinders 126 is extended and each of the pair of mechanisms 64 is moved into the closed or testing position 124. Thus, the sealing surface 176 of the seal 158 is in contacting and sealing relationship with one of the recipient inlet passage 50 and the recipient outlet passage 52 at there respective first end 51 and second end 53. And, the sealing surface 164 of the seal 158 is in contacting and sealing relationship with the respective one of the pair of mechanisms 64. For example, the rod 182 of the cylinder 126 is extended, such as by air pressure, and the linkage 128 connecting with the respective one of the pair of mechanisms 64 is moved from the open or non testing position 110 to the closed or testing position 124.

The vacuum pump 72 is actuated and a vacuum of about 250,000 Pascals (about 36 pounds per square inch) is drawn within the recipient passage 16 between the recipient inlet passage 50 and the recipient outlet passage 52. After attaining the preestablished vacuum the vacuum pump 72 is deactivated. A portion of the plurality of sensors 71 monitors the leakage from the recipient passage 16 and the rate of leakage is indicated by the readout station 78. The results of the test is printed on one of the plurality of spacer bars 20 by the printout mechanism 140.

The lock 132 is unlocked by the operator and the top portion 82 of the table 62 is moved into the open or loading position 98. The tested cell 12 is removed from the bottom portion 80 of the table 62 and is positioned on the output station 66 at either the operational cell position 67 if passing the test or the failed cell position 86 if failing the test.

Thus, the effectiveness of the recuperator 10 is increased by using only cells 12 that pass the test and are positioned in the operational cell position 67 of the output station 66. The cells 12 which are positioned in the failed position 86 can be reworked or scrapped. With the testing or inspection system, apparatus and/or line 60 the effectiveness and efficiency of the recuperator 10 is increased.

Other aspects and advantages of this invention ca be obtained from a study of the drawings, the disclosure, and the appended claims.

What is claimed is:

1. An apparatus for testing a leak within a cell of a recuperator, said cell having a plurality of components, such components being a plurality of primary surface sheets, a plurality of spacer bars and a pair of guide vanes, said apparatus comprising:

a table having a bottom portion and a top portion, said top portion being movable between a closed or testing position and an open or non testing position;

a pair of sealing mechanisms being movable between an open or non testing position and a closed or testing position;

a vacuum pump being operatively connected to said pair of sealing mechanisms; and a controller being operatively connected to said table, said pair of sealing mechanisms and said vacuum pumps said controller being adapted enable operation of said vacuum pump where to said cell being positioned on said table, said table being in said closed or testing position, and said pair of sealing mechanisms being in said closed or testing position.

2. The apparatus for testing a leak within a cell of a recuperator of claim 1, wherein said controller has a plurality of safety devices operatively attached thereto.

3. The apparatus for testing a leak within a cell of a recuperator of claim 1, wherein said apparatus includes a readout station.

4. The apparatus for testing a cell for a recuperator of claim 3 wherein readout station visually marks said cell.

5. The apparatus for testing a leak within a cell for a recuperator of claim 4 wherein said visual marks indicate a decay rate of said cell.

6. The apparatus for testing a leak within a cell for a recuperator of claim 1 wherein said pair of sealing mechanisms are adjustable between said closed or testing position and said open or non testing position.

7. The apparatus for testing, a leak within a cell for a recuperator of claim 1 wherein said cell to be tested has a force exerted thereon by said top portion and said bottom portion.

8. The apparatus for testing a leak within a cell for a recuperator of claim 1 wherein said top portion includes a transparent plate being in force exerting relationship with said cell to be tested.

9. A method of testing for a leak within a cell for a recuperator, said cell having a plurality of components, such components being a plurality of primary surface sheets, a plurality of spacer bars and a pair of guide vanes, said method comprising the steps of:

positioning said cell on a bottom portion of a table with a top portion of said table being in an open or non testing position;

moving said top portion into a closed or testing position;

securing said top portion in said closed or testing position to said bottom portion of said table;

actuating a controller;

moving a pair of sealing mechanisms from an open or non testing position to a closed or testing position;

sensing the position of said top portion relative to said bottom portion of said table;

sensing the position of said sealing mechanisms;

enabling actuation of a vacuum pump where said top portion is in said closed or testing position and said pair of sealing mechanisms are in said closed or testing position;

defining a status of said cell by differentiating between an operational cell and a failed cell;

unsecuring said top portion from said bottom portion of said cell; and moving said top portion into said open or non testing position; and removing said cell from said table.

10. The method of testing for a leak within a cell for a recuperator of claim 9 wherein said plurality of sensors include a plurality of safety devices operatively attached to said controller.

11. The method of testing for a leak within a cell of a recuperator of claim 9 includes a readout station which defines the differentiation between an operational cell and a failed cell.

12. The method of testing for a leak within a cell of a recuperator of claim 11 wherein said readout station being a viewable screen.

13. The method of testing for a leak within a cell of a recuperator of claim 11 wherein said readout station printing a leak rate of said cell on said cell.

14. The method of testing for a leak within a cell of a recuperator of claim 11 wherein said readout station indicates a decay rate of said cell.

15. The method of testing for a leak within a cell of a recuperator of claim 14 wherein said decay rate is defined as a loss of vacuum per a unit of time.

16. The method of testing for a leak within a cell of a recuperator of claim 9 including a safety device which must be actuated by an operator prior to testing being performed.

17. A system for testing a cell for use in a primary surface recuperator, said system comprising:

an input station from which said cell after being assembled is made available for testing;

a testing station including a table, a pair of sealing mechanisms, a controller, a vacuum pump and a readout station, said table having a top portion and a bottom portion and said top portion being movable between an open or non testing position and a closed or testing position, in said closed or testing position of said top portion said cell being positioned in said bottom portion and said top portion being positioned in said closed or testing position, said pair of sealing mechanisms being attached to said bottom portion of said table and being movable between an open or non testing position and a closed or testing position, in said closed or testing position of the pair of sealing mechanisms said cell having a first end of a passage being in contacting sealing relationship with a one of said pair of sealing mechanisms and a second end of said passage being in contacting sealing relationship with an other one of said pair of sealing mechanisms, said controller being in communication with a plurality of sensors, a portion of said plurality of sensor communicating a signal to said controller defining one of a position at which said closed or testing position is operational and a position at which said closed or testing position is not operational, said vacuum pump being actuated by said controller depending on a plurality of signals from a portion of said plurality of sensors, and said readout station defining a status of said cell by differentiating between an operational cell and a failed cell; and an output station having a pair of positions, one of said pair of positions being an operational cell position and a failed cell position.

* * * * *